US011485512B2

(12) United States Patent
Colmagro et al.

(10) Patent No.: US 11,485,512 B2
(45) Date of Patent: Nov. 1, 2022

(54) CLOSED CIRCUIT FOR COOLING THE ENGINE OF AN AIRCRAFT PROPULSION PLANT

(71) Applicants: Airbus Operations (S.A.S.), Toulouse (FR); Airbus (S.A.S.), Blagnac (FR)

(72) Inventors: Jérôme Colmagro, Toulouse (FR); Aurélien Mauconduit, Toulouse (FR)

(73) Assignees: Airbus Operations (S.A.S.), Toulouse (FR); Airbus (S.A.S.), Blagnac (FR)

( * ) Notice: Subject to any disclaimer, the term of this patent is extended or adjusted under 35 U.S.C. 154(b) by 254 days.

(21) Appl. No.: 16/886,142

(22) Filed: May 28, 2020

(65) Prior Publication Data

US 2020/0377222 A1 Dec. 3, 2020

(30) Foreign Application Priority Data

May 31, 2019 (FR) ...................................... 1905818

(51) Int. Cl.
*B64D 33/08* (2006.01)
*B64C 1/06* (2006.01)
*B64C 1/16* (2006.01)
*B64D 27/02* (2006.01)
*H02K 9/19* (2006.01)

(52) U.S. Cl.
CPC .............. *B64D 33/08* (2013.01); *B64C 1/068* (2013.01); *B64C 1/16* (2013.01); *B64D 27/02* (2013.01); *H02K 9/19* (2013.01); *B64D 2027/026* (2013.01)

(58) Field of Classification Search
CPC .. B64D 27/02; B64D 2027/026; B64D 33/08; B64C 1/068; B64C 1/16; H02K 9/19

USPC .............................................................. 244/55
See application file for complete search history.

(56) References Cited

U.S. PATENT DOCUMENTS

| 10,378,556 B2 | 8/2019 | Zaccardi et al. |
| 10,538,337 B2 | 1/2020 | Vondrell et al. |
| 2011/0179767 A1 | 7/2011 | Rinjonneau et al. |
| 2017/0204879 A1 | 7/2017 | Zaccardi et al. |

(Continued)

FOREIGN PATENT DOCUMENTS

| CN | 108 263 620 A | 7/2018 |
| EP | 2 348 210 A1 | 7/2011 |

(Continued)

OTHER PUBLICATIONS

French Search Report for Application No. 1905818 dated Jan. 15, 2020.

*Primary Examiner* — Brady W Frazier
(74) *Attorney, Agent, or Firm* — Jenkins, Wilson, Taylor & Hunt, PA

(57) ABSTRACT

An aircraft propulsion plant including an electric motor having a rotor and a stator mechanically linked to a base which can be mounted at the rear of an aircraft fuselage, a fan rotated by the rotor, a set of fixed blades located downstream of the fan, and a nacelle comprising an outer casing and a fan casing surrounding the fan and the set of fixed blades. The nacelle is mechanically linked to the base through the set of fixed blades. This configuration enables a cooling circuit to be formed for enabling the heat produced by the electric motor at the location of the stator to be evacuated towards the fixed blades and the nacelle where it is dissipated. Furthermore, this heat may be used for the de-icing of the nacelle lip.

8 Claims, 3 Drawing Sheets

(56) References Cited

U.S. PATENT DOCUMENTS

2018/0050810 A1\* 2/2018 Niergarth ................ F01D 15/12
2018/0050811 A1   2/2018 Niergarth et al.
2018/0051716 A1\* 2/2018 Cheung .................. F04D 25/06

FOREIGN PATENT DOCUMENTS

EP   3 392 149 A1   10/2018
EP   3 392 149 B1    4/2020

\* cited by examiner

CLOSED CIRCUIT FOR COOLING THE ENGINE OF AN AIRCRAFT PROPULSION PLANT

CROSS-REFERENCE TO RELATED APPLICATION

This application claims priority to French Patent Application No. 1905818, filed May 31, 2019, the entire disclosure of which is incorporated by reference herein.

TECHNICAL FIELD

The disclosure herein concerns aircraft propulsion systems and more specifically their architecture and their installation on an aircraft.

BACKGROUND

Commercial aircraft most often have a general architecture comprising a fuselage, a wing assembly including two wings and a tail assembly situated on the rear part of the fuselage. Such aircraft further include a propulsion system comprising one or more propulsion plants, those most commonly employed being turbojets. The propulsion plants may be installed on the aircraft in various configurations. Most commonly they are suspended under the wings by support pylons but they may also be fixed to the rear of the fuselage by pylons or at the level of the tail structure.

When the aircraft moves through the air, its external surfaces influence the flow of the air. In particular, when an aerodynamic profile moves in air, a boundary layer is created at the surface of that aerodynamic profile. That boundary layer corresponds to a zone in which the speed of the flow of air is slowed by the viscosity of the air in contact with the surfaces of the profile.

The propulsion plants are generally configured so as not to aspirate this boundary layer created on the aerodynamic surfaces of the aircraft. To this end the propulsion plants are most commonly situated so that their air intake is situated in a free flow of air, that is to say one that is not disturbed much or at all by the surfaces of the aircraft. This is the case when for example the propulsion plants are suspended under the wings or at a distance from the fuselage on the rear part of the aircraft.

Nevertheless, ingestion of this boundary layer by the propulsion plant has certain advantages improving the efficiency of the propulsion of these aircraft and reducing their specific consumption, that is to say the fuel consumption relative to the mass of the aircraft. In order to benefit from these advantages a propulsion plant may therefore be configured to ingest the boundary layer. Propulsion plants of this kind able to ingest the boundary layer are generally designated by the abbreviation BLI (Boundary Layer Ingestion). One possible configuration of a BLI type propulsion plant on an aircraft is installation thereof in the rear part of the fuselage.

An example of a BLI propulsion plant installed in the fuselage rear part is shown in FIG. 1. Hereinafter, where necessary, the relative axial positions of the components of the propulsion system or of other components of the aircraft will be indicated relative to the general direction of the flow of gas through the propulsion plants. The propulsion system of the aircraft 1 shown in FIG. 1 comprises a BLI propulsion plant 2 implanted at the tail of the aircraft 1 and two classic propulsion plants 3, here turbojets, installed under the wings 4 forming the wing structure of the aircraft 1. In this configuration the net or total thrust of the aircraft 1 is the result of adding the thrust of the BLI propulsion plant 2 and the thrust of the two turbojets 3. The BLI propulsion plant 2 includes a drive unit mechanically coupled to a fan that it drives in rotation. The drive unit of the BLI propulsion plant may consist of a heat engine, such as a gas turbine, or an electric motor 5.

For their part, the turbojets 3 include a fan connected to the shaft of a gas turbine that forms the heart of the turbojet, the shaft of the gas turbine driving the fan in rotation. When the drive unit of the BLI propulsion plant consists of an electric motor, the shaft of the gas turbine of the turbojets is connected to an electric generator 6. Thus each of the two turbojets 3 drives directly an electric generator 6. The electric motor 5 of the BLI propulsion plant 2 is fed with the electrical energy produced by the generators 6, which are connected to the electric motor 5 of the BLI propulsion plant 2 situated in the tail of the fuselage 11 by a network of electric cables 7.

One of the problems stemming from the position of a propulsion plant in a fuselage rear part is cooling it. Indeed, the drive unit of a propulsion plant, generally a heat engine of the gas turbine type, is cooled by the circulation of cold external air to cool the interior mechanism of the drive unit. This cold air used for cooling is bled from the front part of the nacelle of the propulsion plant in order to be sure that it is as cold as possible. Thus a portion of the flow of external air ingested by the nacelle of the propulsion plant is used for the combustion that is the source of the propulsive energy generated by the propulsion plant whilst another portion is used to cool it.

A main problem with this type of cooling results from its impact on the aerodynamic drag of the aircraft. Indeed, using the flow of external air for cooling significantly increases the aerodynamic drag of the aircraft, which has a negative influence on its performance, in particular on its fuel consumption. This problem is all the more real when it is a question of using the flow of external air to cool the drive unit of a BLI type propulsion plant. Its installation in the fuselage rear part, generally inside the fuselage, in fact degrades its natural cooling and therefore imposes use of an even higher performance cooling system. Moreover, feeding cold air to a motor situated inside the fuselage necessitates taking in the flow of external air necessary for the operation of the drive unit of the BLI propulsion plant, in particular for cooling it, for example by scoops.

Locating the BLI propulsion plant in the fuselage rear part therefore considerably increases the negative impact on the drag of the aircraft of the forced air cooling of the drive unit of the propulsion plant. The problem of cooling the drive unit of a BLI propulsion plant situated in the fuselage rear part arises in the same way if the drive unit is an electric motor.

SUMMARY

An object of the subject matter herein is a propulsion plant suitable for installation at the rear of an aircraft fuselage and in which the system for cooling the drive unit does not increase much or at all the drag of the aircraft and therefore does not degrade the performance of the aircraft, thereby enabling reduction of the fuel consumption of the propulsion system of the aircraft.

That objective is achieved by the subject matter of the disclosure herein which discloses an aircraft propulsion plant including an electric motor having a rotor and a stator mechanically connected to a base which can be mounted on a rear part of an aircraft fuselage, a fan driven in rotation by the rotor and situated downstream of the base, a set of fixed blades situated downstream of the fan, and a nacelle.

The nacelle has an outer casing and a fan casing surrounding the fan and the set of fixed blades, the nacelle being mechanically connected to the base through the set of fixed blades and a fixed shaft. The propulsion plant further includes a cooling circuit that is able to transport thermal energy generated by the electric motor, the cooling circuit extending at least partly in the stator whence is taken thermal energy to be evacuated to the set of fixed blades where thermal energy is at least partly dissipated by convection in a flow of air accelerated by the fan and passing through the propulsion plant, the set of fixed blades being connected to the stator directly or via the fixed shaft.

The subject matter of the disclosure herein exploits the advantages obtained by using an electric motor BLI type propulsion plant to envisage a cooling system free of the disadvantages of those of the prior art. Using an electric motor in a BLI propulsion plant does not generate a flow of hot air at the nacelle outlet. The set of fixed blades is therefore neither exposed to hot air or in contact with a particularly hot component of a thermal engine. It can therefore be used as a heat dissipation surface subjected to a flow of cold air to evacuate by convection thermal energy that is conveyed to it by the cooling circuit.

The cooling circuit is advantageously extended beyond the set of fixed blades in the nacelle between the fan casing and the outer casing in such a manner that the remaining portion of thermal energy transported by the cooling circuit is evacuated via the fan casing and/or the outer casing of the nacelle.

The outer casing and the fan casing preferably join in the front part of the nacelle to form a lip and the part of the cooling circuit situated in the nacelle passes the lip in such a manner as to be able to de-ice it.

The heat remaining in the cooling circuit at the level of the lip of the nacelle can therefore be employed for de-icing it.

Additionally, the cooling circuit may partly consist of or comprise circulation channels extending longitudinally in at least some of the fixed blades of the set of fixed blades in the form of cavities or of tubes.

Also, the stator may extend at least partly in the base upstream of the fan.

Alternatively, the stator may extend at least partly downstream of the set of fixed blades.

Advantageously, a dielectric fluid is used both as heat-transfer fluid in the cooling circuit and as a lubricant in the electric motor.

In accordance with a second aspect of the disclosure herein there is proposed an aircraft fuselage rear part including a propulsion plant as defined above mechanically connected to the fuselage rear end by its base.

In accordance with a third aspect of the disclosure herein there is proposed an aircraft including an aircraft fuselage rear part as defined above.

BRIEF DESCRIPTION OF THE DRAWINGS

Other features and advantages of the disclosure herein are disclosed by the following description of nonlimiting embodiments of the various aspects of the disclosure herein. The description refers to the appended figures which are also given by way of nonlimiting examples of embodiments of the disclosure herein.

DETAILED DESCRIPTION

Figure 1:
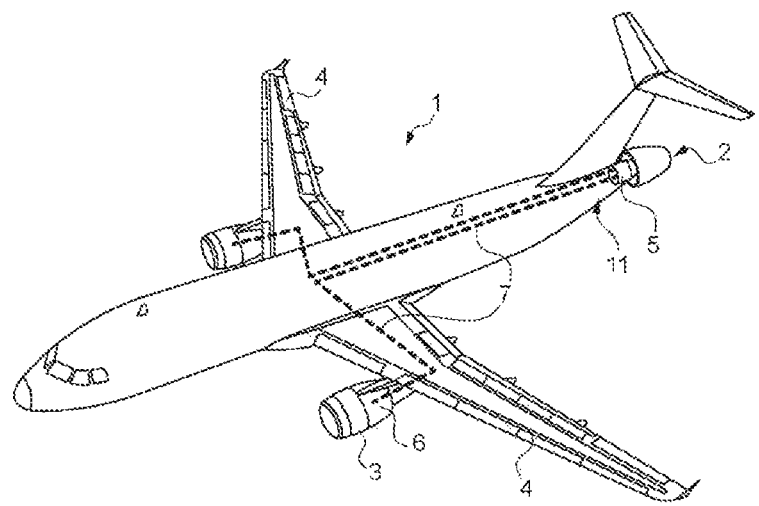
FIG. 1 represents a perspective view of an aircraft.

FIG. 1 has already been described in the preamble to the present description.

Figure 2:
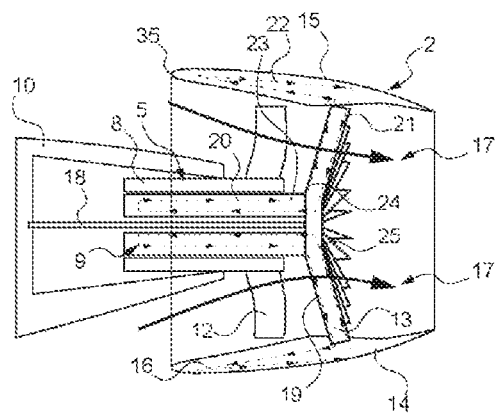
FIG. 2 represents a side view in section of the propulsion plant.

FIG. 2 shows a BLI type propulsion plant 2 including a drive unit consisting of or comprising an electric motor 5 including a rotor 8 and a stator 9. The stator 9 is mechanically connected to a set of fixed blades 13. A fan 12 situated upstream of the set of fixed blades 13 is mechanically connected to the rotor 8 of the electric motor 5, which drives it in rotation.

A nacelle 14 including an outer casing 15 and a fan casing 16 surrounds the fan 12 and the set of fixed blades 13. The nacelle 14 is mechanically connected to the base 10 via the set of fixed blades 13. All the mechanical loads to which the nacelle 14 is subjected are therefore transmitted to the set of fixed blades 13 which in turn transmit them to the base 10 via a fixed shaft 18.

The rotor 8 of the electric motor 5 drives in rotation the fan 12, which accelerates a flow of air 17 aspirated at the entry of the nacelle 14 and straightened downstream of the fan 12 by the set of fixed blades 13 before being ejected out of the propulsion plant 2 via the rear end of the nacelle 14.

Figure 4:
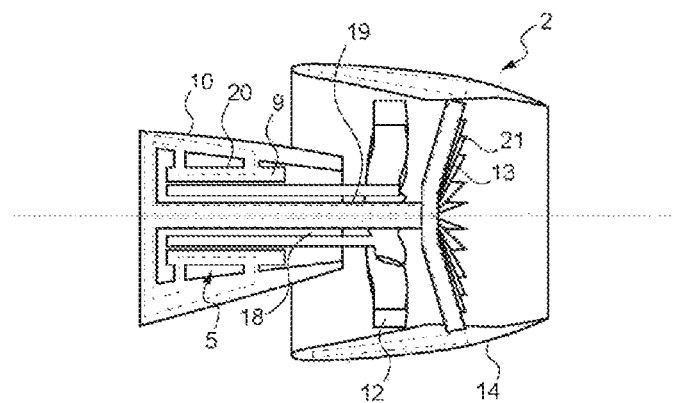
FIG. 4 represents a side view in section of a variant propulsion plant.
Figure 5:
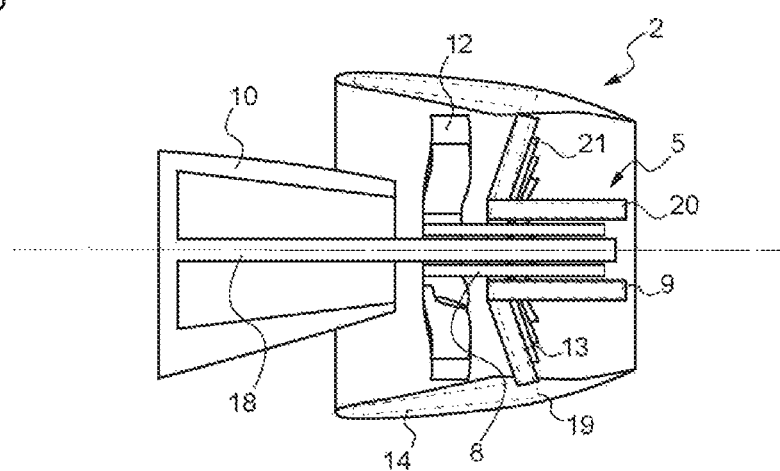
FIG. 5 represents a side view in section of another variant propulsion plant.

When the BLI propulsion plant 2 is operating the electric motor 5 generates heat. This is evacuated by a cooling system including a cooling circuit 19. A first part of the cooling circuit 20 is situated in the stator 9 where it captures thermal energy generated by the electric motor 5. A second part of the cooling circuit 21 extends in the fixed blades of the set of fixed blades 13 whilst a third part 22 of the cooling circuit 19 extends in the nacelle 14 between the outer casing 15 and the fan casing 16. All the parts of the cooling circuit 19 together form a closed circuit in which a heat-transfer fluid circulates. The configuration of the cooling circuit indicated hereinabove is described by way of illustration only and could vary according to circumstances, in particular the configuration of the rotor, stator and fixed shaft assembly as shown in FIGS. 4 and 5. Likewise, it is not obligatory to extend the cooling circuit 19 to the nacelle 14.

In a variant embodiment not represented in the figures the cooling circuit includes a heat pipe connecting together the stator 9 of the electric motor 5, the set of fixed blades 13 and the nacelle 14. The heat pipe is made of a heat-conducting material and is sized in order to be able to drain thermal energy generated by the electric motor and accumulated in the stator 9 to the set of fixed blades 13 and the nacelle 14, where it is dissipated by convection with the flows of air flowing along those elements.

In the example from FIG. 2 the heat-transfer fluid circulating in the cooling circuit 19 enables an exchange of heat between the electric motor 5 encapsulated in the propulsion plant 2 and, on the one hand, the flow of air 17 passing through the set of fixed blades 13 and, on the other hand, the ambient air surrounding and/or passing through the nacelle 14. The arrows drawn on the cooling circuit 19 in FIG. 2 indicate the direction of circulation of the heat-transfer fluid in the closed circuit.

Thermal energy produced by the electric motor 5 when operating therefore heats the heat-transfer fluid circulating in the first part of the cooling circuit 20 at the level of the stator 9.

The hot heat-transfer fluid arrives in the second part of the cooling circuit 21 at the level of the set of fixed blades 13 where a first exchange of heat occurs by forced convection with the flow of cold air leaving the fan 12. Indeed, because the electric motor 5 does not generate hot combustion gas, the flow of air 17 passing through the propulsion plant 2 remains cold and may be used to effect at least a first stage of cooling at the level of the set of fixed blades 13 of the hot heat-transfer fluid leaving the stator 9. The partly cooled heat-transfer fluid coming from the set of fixed blades 13 then arrives in the third part of the cooling circuit 22 at the level of the nacelle 14. A second exchange of heat occurs in the nacelle 14. The residual heat conveyed by the heat-transfer fluid is dissipated there by convection across the inner surface of the fan casing 16 and across the outer surface of the outer casing 15.

Finally, the completely cooled heat-transfer fluid returns via the cooling circuit 19 to the set of fixed blades 13 and then to the stator 9, thus forming a closed circuit. Thermal levels of the heat-transfer fluid vary in the various parts of the cooling circuit 19. The part of the cooling circuit situated in the stator 9 and in which the heat-transfer fluid flows toward the fixed blades 26 corresponds to the highest temperature of the heat-transfer fluid. That is to say its temperature where it collects heat at the level of the stator 9. The part of the cooling circuit situated in the fixed blades 26 and the nacelle 14 in which the heat-transfer fluid flows at the base of the fixed blades toward the lip 35 of the nacelle and the part of the cooling circuit situated in the stator in which the heat-transfer fluid flows at the base of the fixed blades toward the end of the stator 9 corresponds to an intermediate temperature of the heat-transfer fluid. That is to say its temperature where it begins to cool on passing through the set of fixed blades 13 and arriving in the nacelle 14 and where it begins to cool on returning into the stator 9. The part of the cooling circuit situated in the nacelle 14 and the fixed blades 26 in which the heat-transfer fluid flows from the lip 35 of the nacelle to the stator 9 corresponds to the lowest temperature level of the heat-transfer fluid. That is to say its temperature where it returns from the nacelle 14 to the stator 9 via the set of fixed blades 13.

Figure 3A:
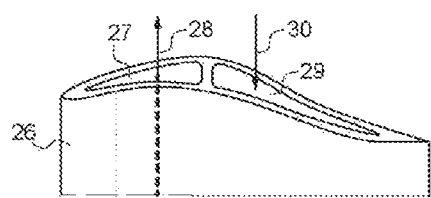
FIG. 3a represents a detail view in section and in perspective of a fixed blade with cavities.
Figure 3B:
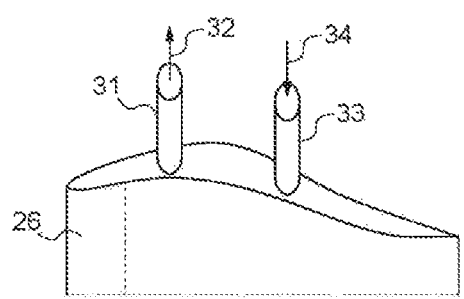
FIG. 3b represents a detail view in section and in perspective of a fixed blade with tubes.

The second part of the cooling circuit 21 at the level of the set of fixed blades 13 is formed by longitudinal circulation channels in the fixed blades 26 of the set of fixed blades 13 as shown in FIGS. 3a and 3b. All or only some of the fixed blades 26 include heat-transfer fluid circulation channels. The number of fixed blades 26 including these circulation channels depends in particular on the quantity of heat to be dissipated at the level of the set of fixed blades 13 and on the geometrical characteristics of those circulation channels. Various options exist for producing these circulation channels in the fixed blades 26.

For example, in FIG. 3a the circulation channels take the form of cavities 27 and 29 produced during production of the fixed blades 26 by machining, forging or casting. The fixed blades 26 include two cavities, a first cavity 27 in which circulates the hot heat-transfer fluid 28 coming from the stator 5 and a second cavity 29 in which circulates the cold heat-transfer fluid 30 coming from the stator 5.

A second embodiment of the circulation channels in the fixed blades 26 is shown in FIG. 3b. In this other embodiment of the circulation channels longitudinal tubes are inserted into channels that may be bored in the body of the fixed blades 26. The hot heat-transfer fluid 32 coming from the stator 5 circulates in a first tube 31. Whereas the cold heat-transfer fluid 34 returning to the stator 5 circulates in a second tube 33.

The cavities 27 and 29 have the advantage of optimizing the shape of the circulation channels to maximize the areas of heat exchange and the flow section of the heat-transfer fluid in the fixed blade. Nevertheless, it is more costly to produce hollow blades 26 including the cavities 27 and 29 than to drill them and to insert therein the tubes 31 and 33.

As shown in FIG. 2, in the front part of the nacelle 14 is found an air intake opening into an inner duct consisting of or comprising the fan casing 16. This inner duct channels the air toward the fan 12. The air intake is provided with a lip 35 the inner edge of which is joined to the fan casing 16 and the outer edge of which is joined to the outer casing 15 of the nacelle 14. This lip 35 has an aerodynamic function and a function of protecting the drive system against, for example, the penetration of birds into the duct leading to the fan 12.

During flight phases frost or ice may form at the level of the air intake of the fan 12. The accumulation of ice upstream of the fan may have an influence on the performance of the BLI propulsion plant 2 and in extreme cases lumps of ice may be detached and aspirated into the fan casing 16 to strike the blades of the fan 16. A de-icing system is generally installed in the lip 35 to prevent the formation of frost or ice.

As indicated hereinabove and shown in FIG. 2, two exchanges of heat occur during the circulation of the heat-transfer fluid in the cooling circuit 19 in order to cool it. A first exchange of heat occurs at the level of the set of fixed plates 13 and a second exchange of heat occurs at the level of the nacelle 14. By causing the front portion of the third part of the cooling circuit 22 to pass along the lip 35 it is possible to use that part of the cooling circuit as a system for de-icing the nacelle 14 and thus for preventing the formation of frost or of ice at the level of the lip 35.

The heat-transfer fluid used in the cooling circuits is generally a fluid selected for its specific heat, that is to say the quantity of energy to be added to raise by one degree Kelvin the temperature per unit mass of the fluid. In parallel with this, the electric motor 5 must also be lubricated when it is operating. It is therefore judicious to choose a dielectric heat-transfer fluid also having lubricating properties for lubricating the electric motor 5 as well as cooling it.

FIG. 2 shows an example of an interior architecture of the propulsion plant 2 in which the stator 9 is fixed directly to the set of fixed blades 13 and extends substantially upstream of the latter. Likewise, the rotor 8 is mechanically connected to the fan 12 and extends substantially upstream of the latter. Thus, the electric motor is partly accommodated in the base 10.

FIG. 4 shows a variant inner architecture of the propulsion plant 2 in which the stator 9 is no longer connected directly to the set of fixed blades 13 but to the base 10. In this situation the stator 9 is substantially integrated inside the base, which moves it away from the set of fixed blades 13 compared to the FIG. 2 configuration.

Consequently, the cooling circuit is routed differently. Indeed, the part of the cooling circuit situated at the level of the set of fixed blades 13 no longer being in the immediate vicinity of the part of the cooling circuit extending in the stator 9, they must both be connected by circulation channels extending longitudinally in the fixed shaft 18 between the set of fixed blades 13 and the part of the base 10 to which the fixed shaft 18 is fixed.

FIG. 5 shows another variant of the inner architecture of the propulsion plant 2 in which the electric motor 5 is positioned substantially downstream of the fan 12 and of the set of fixed blades 13. In this configuration the stator 9 is connected directly to the set of fixed blades 13 and extends substantially downstream of the latter, just like the rotor 8 extends downstream of the fan 12. The stator 9 being connected directly to the set of fixed blades 13, the first part of the cooling circuit 20 extending in the stator 9 can be connected directly to the second part of the cooling circuit 21 extending in the set of fixed blades 13. As in the architecture shown in FIG. 2, this configuration enables a more compact cooling circuit 19 to be obtained. These three embodiments of the concept of the disclosure herein that lies in the use of the nacelle 14 and of the set of fixed blades 13 to cool the electric motor 5 show that the disclosure herein can be adapted to other types of architecture of the propulsion plant 2 using an electric motor 5.

As described hereinabove the heat exchangers forming part of the cooling circuit 19 are integrated into members already existing in the BLI propulsion plant 2. Thus, implementing the disclosure herein necessitates no or only few additional parts. In addition to the advantages described in the introductory part of the description, the integration of ancillary functions into members already present in the propulsion plant 2, such as cooling the electric motor 5 or de-icing the nacelle 14, enable the structure of the propulsion plant 2 to be lightened and simplified, which commensurately reduces the production and maintenance costs thereof whilst improving the overall energy efficiency of the aircraft. The same goes for the use of the heat-transfer fluid to lubricate the electric motor 5. Because of its large inner and outer convection areas, the nacelle 14 forms a high-performance heatsink for dissipating the heat produced by the electric motor 5.

As indicated in the foregoing description, the various aspects of the disclosure herein, such as for example the inner architecture of the propulsion plant, the nacelle de-icing, cooling and motor lubrication functions, may be implemented separately or in any combination according to the context and in variant configurations different from those described hereinabove.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft propulsion plant comprising:
   an electric motor having a rotor and a stator mechanically connected to a base which can be mounted on a rear part of an aircraft fuselage;
   a fan driven in rotation by the rotor;
   a set of fixed blades situated downstream of the fan, the fixed blades being mechanically connected to a fixed shaft that is fixed to the base;
   a nacelle having an outer casing and a fan casing surrounding the fan and the set of fixed blades, the nacelle being mechanically connected to the set of fixed blades; and
   a cooling circuit to transport thermal energy generated by the electric motor, the cooling circuit extending at least partly in the stator whence is taken thermal energy to be evacuated to the set of fixed blades where thermal energy is at least partly dissipated by convection in a flow of air accelerated by the fan and passing through the propulsion plant, the set of fixed blades being connected to the stator directly or via the fixed shaft.

2. The aircraft propulsion plant of claim 1, wherein the cooling circuit is extended beyond the set of fixed blades in the nacelle between the fan casing and the outer casing such that at least a portion of thermal energy transported by the cooling circuit is evacuated via the fan casing and/or the outer casing of the nacelle.

3. The aircraft propulsion plant of claim 2, wherein the outer casing and the fan casing join in a front part of the nacelle to form a lip and a part of the cooling circuit situated in the nacelle passes the lip so as to be able to de-ice it.

4. The aircraft propulsion plant of claim 1, wherein the cooling circuit includes circulation channels extending longitudinally in at least some of the fixed blades of the set of fixed blades in a form of cavities or of tubes.

5. The aircraft propulsion plant of claim 1, wherein the stator extends at least partly in the base upstream of the fan.

6. The aircraft propulsion plant of claim 1, wherein a dielectric fluid is used both as a heat-transfer fluid in the cooling circuit and as a lubricant in the electric motor.

7. An aircraft fuselage subassembly comprising a fuselage rear part and a propulsion plant of claim 1 mechanically connected by its base to the fuselage rear part.

8. An aircraft including an aircraft fuselage subassembly of claim 7.

* * * * *